(12) United States Patent
Liou et al.

(10) Patent No.: US 7,031,612 B2
(45) Date of Patent: Apr. 18, 2006

(54) OPTICAL TRANSPONDERS AND TRANSCEIVERS

(75) Inventors: Kang-Yih Liou, Holmdel, NJ (US); Tawee Tanbun-Ek, Califon, NJ (US); Won-Tien Tsang, Holmdel, NJ (US); Liang David Tzeng, Belle Mead, NJ (US)

(73) Assignee: Multiplex, Inc., South Plainfield, NJ (US)

( * ) Notice: Subject to any disclaimer, the term of this patent is extended or adjusted under 35 U.S.C. 154(b) by 804 days.

(21) Appl. No.: 09/907,283

(22) Filed: Jul. 17, 2001

(65) Prior Publication Data

US 2002/0060824 A1 May 23, 2002

Related U.S. Application Data

(60) Provisional application No. 60/218,919, filed on Jul. 18, 2000.

(51) Int. Cl.
*H04B 10/00* (2006.01)

(52) U.S. Cl. .................. 398/135; 398/136; 398/137; 398/138; 398/139; 398/140; 398/182; 398/202; 398/211; 372/40; 372/43; 372/46; 372/55

(58) Field of Classification Search ......... 398/135–139, 398/140, 173, 182, 198, 202, 211; 372/40, 372/55, 46, 43

See application file for complete search history.

(56) References Cited

U.S. PATENT DOCUMENTS

| | | | |
|---|---|---|---|
| 3,952,404 A | 4/1976 | Matunami | |
| 4,961,198 A | 10/1990 | Ishino et al. | |
| 5,165,105 A | 11/1992 | Haase et al. | |
| 5,528,409 A * | 6/1996 | Cucci et al. | 398/15 |
| 5,543,353 A | 8/1996 | Suzuki et al. | |
| 5,548,607 A | 8/1996 | Tsang | |
| 5,680,411 A | 10/1997 | Ramdane et al. | |
| 5,745,511 A | 4/1998 | Leger | |
| 5,787,106 A | 7/1998 | Tabuchi et al. | |
| 5,987,046 A | 11/1999 | Kobayashi et al. | |
| 5,991,322 A | 11/1999 | Takiguchi et al. | |
| 6,101,011 A * | 8/2000 | Taylor | 398/1 |
| 6,108,362 A | 8/2000 | Adams et al. | |
| 6,150,667 A | 11/2000 | Ishizaka et al. | |
| 6,256,127 B1 * | 7/2001 | Taylor | 398/9 |
| 6,542,660 B1 * | 4/2003 | Medin et al. | 385/24 |
| 6,580,531 B1 * | 6/2003 | Swanson et al. | 398/5 |
| 6,597,479 B1 * | 7/2003 | Chu et al. | 398/41 |
| 6,694,100 B1 * | 2/2004 | Fatehi et al. | 398/99 |

OTHER PUBLICATIONS

T.Tanbun–Ek et al., "10 Gbit/s Penalty–Free Transmission Over 48 km Using 1.3–μm Wavelength Electroabsorption Modulated Lasers (EML) For Metro–Loop Transmission Link," Optical Fiber Communications Technical Digest, San Jose, CA, pp 207, paper ThB4, (1996).

M. Aoki et al., "High–Extinction–Ration MQW Electroabsorption–Modulator Integrated DFB Laser Fabricated by In–Plane Bandgap Energy Control Technique," IEEE Photonics Technology Letters, vol. 4 pp. 580, (1992).

(Continued)

*Primary Examiner*—Jason Chan
*Assistant Examiner*—Chau M. Nguyen
(74) *Attorney, Agent, or Firm*—Testa, Hurwitz & Thibeault, LLP

(57) ABSTRACT

An optical transponder/transceiver for intermediate range (e.g., 10–50 km) optical communication applications utilizes an electroabsorption modulated laser for the transmitting device. Preferably, the laser operations at a wavelength of approximately 1310 nm and comprises an electroabsorption modulated Fabry-Perot laser.

11 Claims, 4 Drawing Sheets

OTHER PUBLICATIONS

T. Tanbun–Ek et al., "Integreted DFB–DBR Laser Modulator Grown by Selective Area Metalorganic Vapor Phase Epitaxy Growth Technique," in $7^{th}$ International Conference on Metalorganic Vapor Phase Epitaxy, Yokahama, Japan, (1994).

J. E. Johnson et al., "Low–Chirp Integrated EA–Modulator/DFB Laser Grown by Selective–Area MOVPE," in $14^{th}$ IEEE International Semiconductor Laser Conference, Maui, paper M4.7, (1994).

J. E. Johnson et al., "Integrated Electroabsorption Modulators for WDM Systems," in LEOS '95 Conference Proceedings, San Francisco, CA,. Paper 105.2, (1995).

P. A. Morton et al., "High–Speed Integrated DFB/Electroabsorption Modulated Lasers," in Conference on Lasers and Electro–Optics 1996 Technical digest, Anaheim, CA, paper CWL1, (1996). (Abstract Only).

Y. K. Park et al., "Dispersion–Penalty–Fee Transmission Over 130–km Standard Fiber Using a 1.55–µm, 10–Gb/s Integrated EA/DFB Laser with Low–Extinction Ration and Negative Chirp," IEEE Photonics Technol. Lett., vol. 8, No. 9, pp1255–1257, (1996).

Reference Document For 300 Pin 10GB Transponder, Apr. 16, 2001.

* cited by examiner

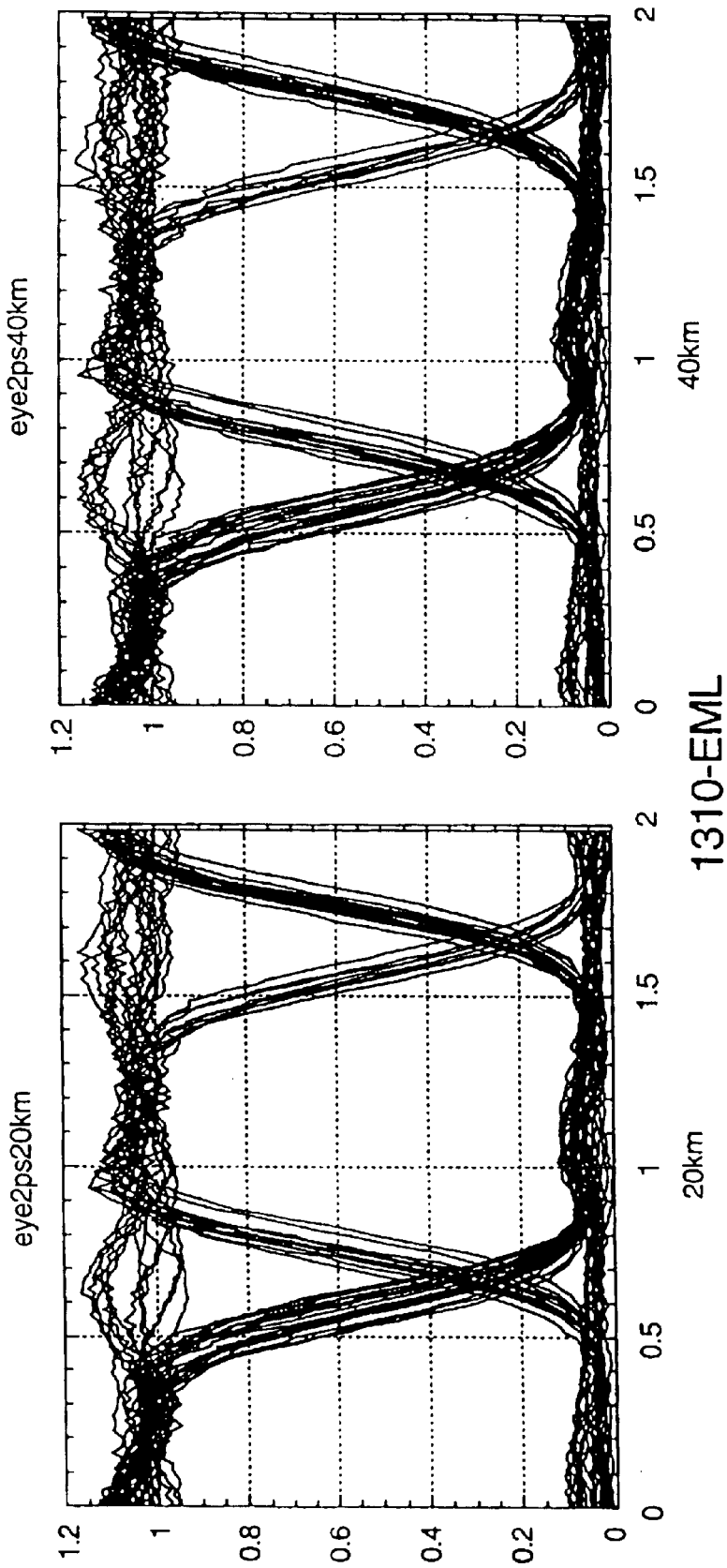

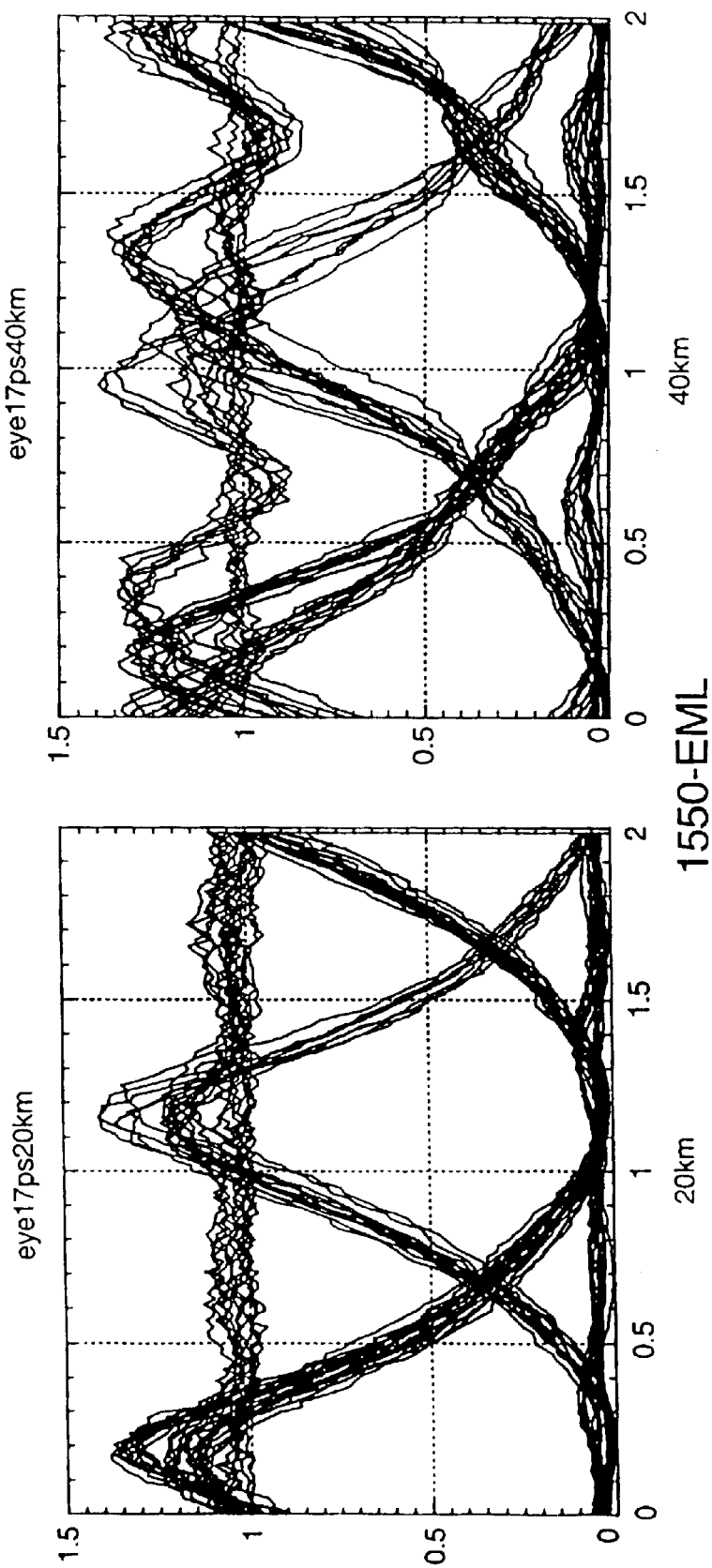

OPTICAL TRANSPONDERS AND TRANSCEIVERS

CROSS REFERENCE TO RELATED APPLICATION

This application claims the prior art Provisional Application No. 60/218,919, filed Jul. 18, 2000.

TECHNICAL FIELD

The present invention relates to optical transponders and transmitters and, more particularly, to such transponders and transceivers using a 1310 nm electroabsorption modulated Fabry-Perot laser module as the optical transmitting device.

BACKGROUND OF THE INVENTION

Fiber optic (digital) communication systems are now preferred over and being installed to replace a variety of conventional cable network systems, primarily due to their wide spectral characteristics that allow a user to transmit broadband signals, as well as their flexibility in terms of the available choices for data rates. However, at very high data rates (for example, Gb/s or higher), the limited performance capabilities of readily available and reduced-cost electronic circuits and components has limited the end-to-end link distance of fiber optic networks to essentially that of a local area network, covering a distance of on the order of 5 km or less. As telecommunications customers are increasingly relying upon the rapid information access and transport capabilities of digital communication networks, it has become apparent to most service providers that the need exists to extend the range of high speed data communications to distances well beyond that of the local area network limit, but in a manner that is both transparent and cost acceptable to the end user.

In some of the network solutions, an optical transponder is used to extend the range of a full duplex fiber optical communication system upwards of 30 to 100 km. The fiber optic transponder includes a front-end (short haul) transceiver unit that contains an opto-electronic converter-receiver and an associated electro-optic converter transmitter. The front end's opto-electronic converter-receiver is coupled to an optical fiber of a local area network, through which gigabit digital data is supplied that is to be transported over a long distance fiber optic link for delivery to a recipient customer site. While the LAN fiber may be either multimode or single mode, the long distance fiber is required to be single mode, exhibiting a zero dispersion wavelength of either 1310 nm or 1550 nm, where the 1550 nm single mode fiber is primarily used in the prior art for the longest distance transmission systems. The electro-optic converter-transmitter unit is operative to convert electrical signals that have been regenerated from long distance optical data received from a far end site into optical signals for delivery to the LAN.

The optical transmitter included in the output of the transponder preferably includes a high speed, low jitter, current-limiting driver, which minimizes jitter generation, and thereby optimizes range extension margin. In most prior art transmitter arrangements, the current driver is controlled by a regulated drive current controller to ensure that the output extinction ratio of the laser diode is able of precise setting and remains highly stable, thereby minimizing wavelength chirp, so as to prevent undesirable dispersion effects through a dispersive, long fiber. To minimize potential dispersion for the long distance fiber link, the laser diode of choice in the prior art has been the distributed feedback (DFB), due to its narrow spectral width and an output wavelength that matches the zero dispersion wavelength of long haul transmission fiber (i.e., 1550 nm).

In some newer arrangements, 1550 nm electroabsorption modulated lasers (EMLs) are being deployed in high speed, 2.5 Gb/s and 10 Gb/s fiber optic networks. The advantage of these devices, as compared to the DFB lasers mentioned above, is that electroabsorption modulated lasers exhibit highly superior eye diagrams, with less pulse distortion/ringing, minimal chirp characteristics, high extinction ratio, and simplified driver circuitry. At the same time, there is a rapid increase in the deployment of fiber optic-based equipment which utilize transponder, transceiver and transmitter modules operating at 10 Gb/sec and at wavelengths near the 1310 nm dispersion minimum of optical fiber. Currently, directly modulated 1310 nm DFB or Fabry-Perot (FP) lasers are utilized in these applications. However, directly modulated DFB and FP lasers exhibit severe limitations due to relaxation oscillation effects and the difficulties of modulating the drive current at 10 Gb/sec. Thus, a need remains in the art for a laser source that is useful in the "intermediate" range (e.g., 10–50 km) between short haul (5 km) and long haul (over 100 km) applications, when using optic fiber with a zero dispersion wavelength at 1310 nm, that overcomes the drawbacks of the directly modulated DFB and FP lasers.

SUMMARY OF THE INVENTION

The need remaining in art is addressed by the present invention, which relates to optical transponders and transmitters and, more particularly, to such transponders and transceivers using a 1310 nm electroabsorption modulated Fabry-Perot (FP) laser module as the optical transmitting device.

In accordance with the present invention, an electroabsorption modulated laser is used in a transceiver or transponder arrangement and is formed to include a Fabry-Perot laser section operated in CW mode and an electroabsorption modulator that is responsive to the incoming (electrical) digital data signal to generate the modulation input for the FP laser section. The FP EML device is formed as a monolithic structure which, as a result of simplified fabrication processes, is relatively inexpensive to manufacture and exhibits a relatively high yield.

It is an advantage of the present invention that the use of a FP EML-based transceiver or transponder operating at 1310 nm is advantageous in short and intermediate reach applications where the superior eye diagram characteristics and voltage modulation can be utilized to offset cost in the rest of the system.

Other and further advantages of the present invention will become apparent during the course of the following discussion and by reference to the accompanying drawings.

BRIEF DESCRIPTION OF THE DRAWINGS

Referring now to the drawings,

FIGS. 4(a) and 4(b) contain graphs comparing the performance of a 1310-EML transmitter, formed in accordance with the present invention, versus a 1550-EML, for intermediate distances of 20 km and 40 km.

DETAILED DESCRIPTION

Figure 1:
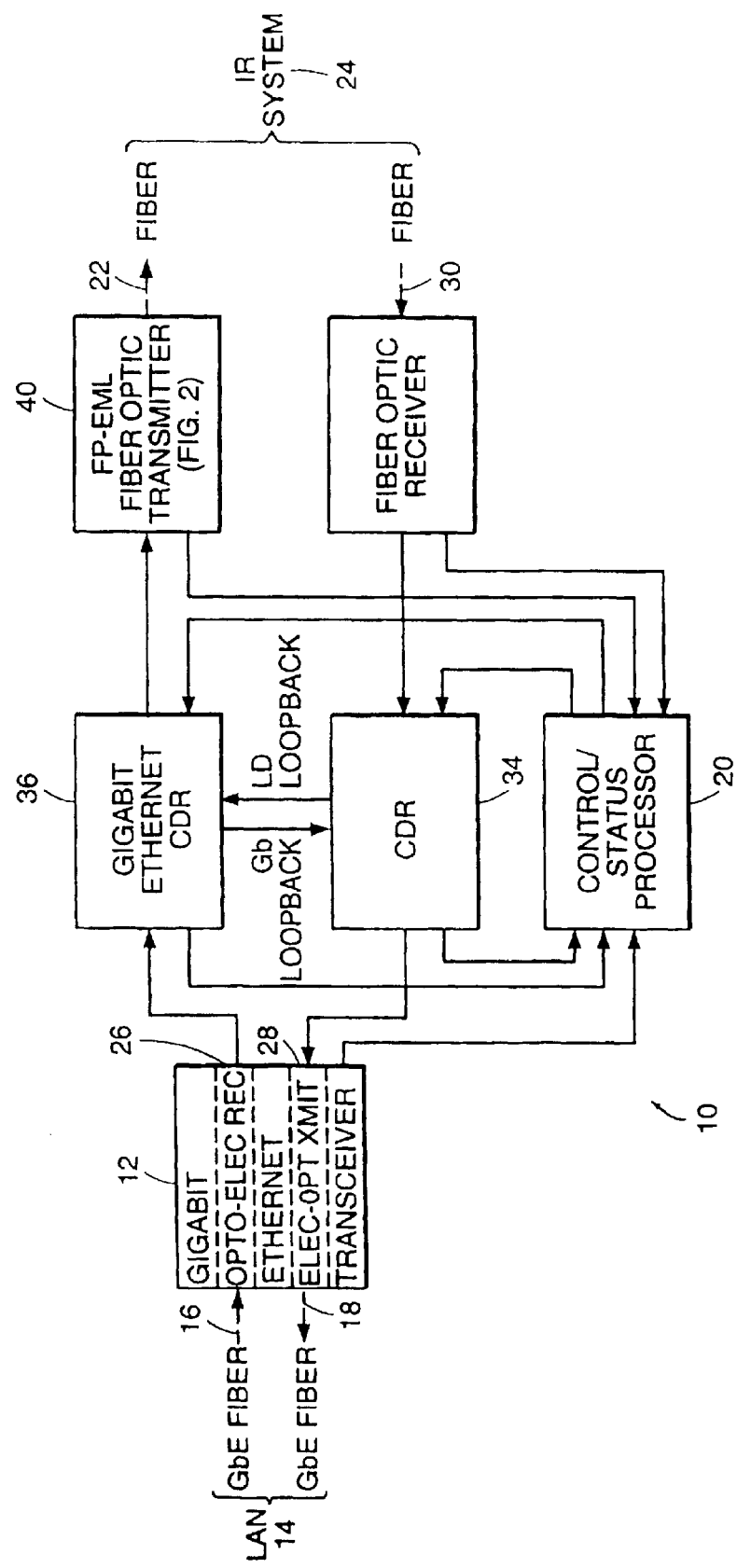
FIG. 1 contains a simplified diagram of an exemplary optical transponder, illustrating the position and operation of the laser diode module.

FIG. 1 illustrates the architecture of an exemplary transponder 10 for interfacing a short haul high speed fiber optic data link, such as a Gigabit Ethernet (GbE) LAN, with an intermediate range fiber optic link. As mentioned above, a number of optical communication applications have emerged which utilize "intermediate" distance range of 10–50 km (as opposed to the LAN application range of 5 km and the "long haul" applications using upwards of 100 km). Referring to FIG. 1, transponder 10 includes a front-end that includes a transceiver 12 for communicating with LAN 14 via, for example, a pair of GbE optical fibers 16, 18 (using a conventional optical coupling arrangement, not shown). A control and status monitoring processing 20 may be included in transponder 10 to aid the operator in assessing the performance of transponder 10.

As an example using the particular arrangement illustrated in FIG. 1, customer-sourced gigabit digital data (having, for example, a data rate of 1.25 GB/s) is to exit LAN 14 and be transported through transponder 10 to an outgoing fiber 22 associated with an intermediate range communication system 24 (and presumably, applied as an input to another LAN at the far end of the intermediate range system). In this outgoing direction (i.e., from LAN 14), the front end of transceiver 12 contains an opto-electronic converter-receiver 26, the input of which is coupled to a first, incoming section of optical fiber 16 of LAN 14. Opto-electronic converter-receiver 26 is operative to convert incoming optical data signals supplied over incoming fiber 16 into electrical signals that are representative of the Ethernet-formatted customer data. Transceiver 12 also includes a (short haul) electro-optic converter-transmitter unit 28, the output of which is coupled to the second (out-going) optical fiber 18 of LAN 14. The electro-optic converter-transmitter unit 28 is operative to convert electrical signals that have been regenerated from light signals modulated with (Gigabit Ethernet formatted) data that has been transported over an incoming fiber 30 of the intermediate range fiber optic link 24 and destined for LAN 14.

Figure 2:
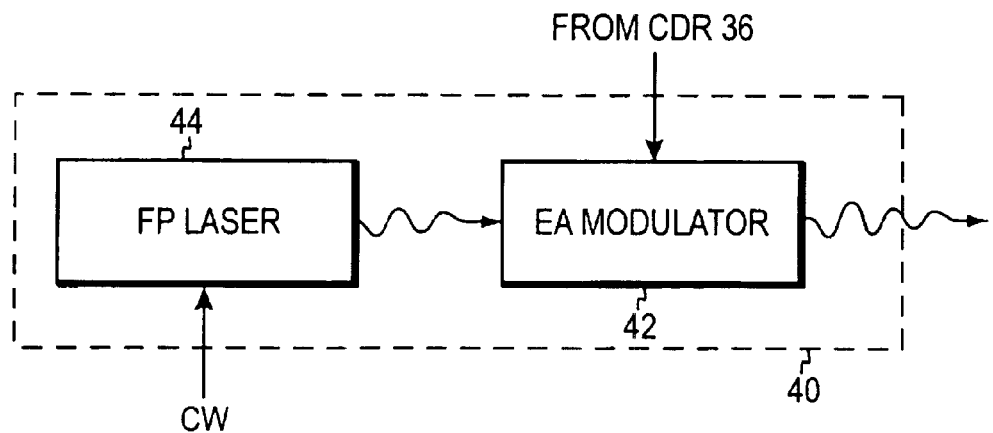
FIG. 2 is a block diagram of an exemplary FP-EML laser transmitter suitable for use in the transponder of FIG. 1.

Due to the distance (for example, 10–50 km) the optical signals must propagate between transponder locations, coupled with the timing jitter of low-cost short-haul transceiver components, the modulated light signal transported by intermediate range fiber optic link 24 can be expected to undergo significant (and unacceptable) degradation (in terms of amplitude, signal shape and timing) by the time it reaches the far end of link 24. Accordingly, the use of a clock/data regenerator 34 (CDR) in both the transmit and receive paths, in combination with precision-controlled optical signal processing components within processor 20, serves to pre- and post-compensate for distortion and timing jitter, and thereby ensure accurate regeneration of the data at each end of the intermediate range link. The highly precise and jitterless serial data stream signal produced by transmitter regenerator 36 is coupled as a data drive input to FP-EML laser transmitter 40, where transmitter 40 is illustrated in more detail in FIG. 2.

In particular, FP-EML laser transmitter 40 comprises an input electroabsorption (EA) modulator section 42, which receives as an electrical input the data signal described above. Formed on the same substrate as EA modulator 42 is a Fabry-Perot (FP) laser section 44, comprising an MQW active region configured to lase at 1310 nm. A CW input signal is applied to FP laser section 44 such that the optical output will be modulated with the data signal passing through EA modulator 42. As shown in FIG. 1, the output from transmitter 40 is then coupled into fiber 22 for transmission along intermediate range data link 24 to a far-end LAN (not shown). In the reverse direction, input optical signals received over optical fiber 30 from intermediate range data link 24 is applied as an input to an optical receiver 38, which functions to convert the received optical signal into an electrical equivalent. The converted electrical signal is then passed through CDR 34 for re-shaping and regeneration and then applied as an input to electro-optic transmitter 28 within transceiver 12. The regenerated electrical signal is then converted to an optical output signal and passed along optical fiber 18 into LAN 14.

Figure 3:
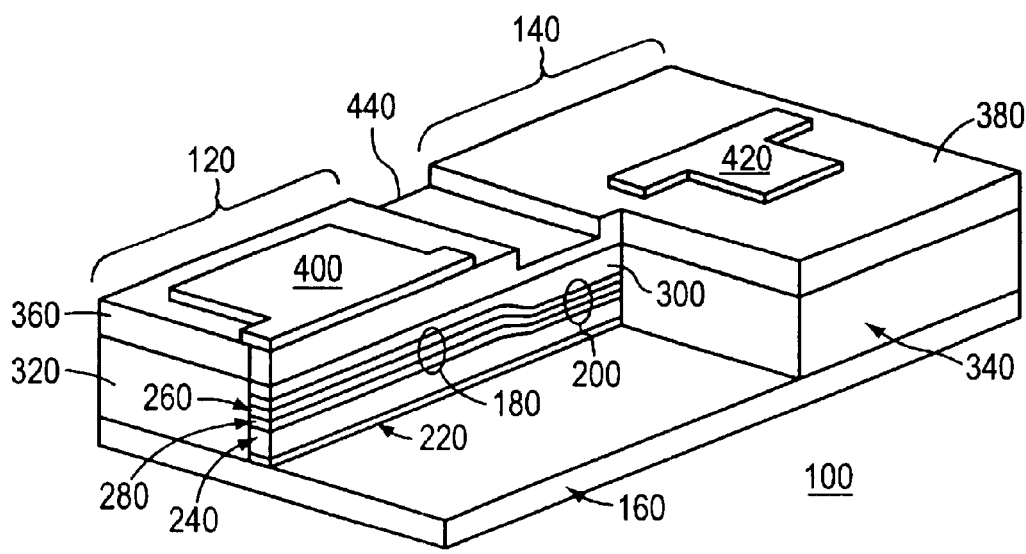
FIG. 3 is an isometric view of an exemplary FP-EML device.

A cut-away isometric view of a Fabry-Perot electroabsorption modulated laser (FP-EML) 100 useful in the transponder arrangement of FIG. 1 is illustrated in FIG. 3. As mentioned above, FP laser 120 section is operated in CW mode and EA modulator section 140 is subjected to the input data signal from LAN 14. Both FP laser 120 and EA modulator 140 are formed on a common InP substrate 160, where FP laser 120 comprises a multiple quantum well (MQW) action region 180 which transitions to become a MQW action region 200 in EA modulator 140. A selective area growth (SAG) technique may be used to form this MQW structure and insure that active region 180 in laser 120 is emissive (relatively thick MQW layers), while active region 200 in EA modulator 140 is absorptive (relatively thin MQW layers). The transition between the MQW layer thickness is evident in area 220 of the cut-away view of FIG. 3.

Referring to FIG. 3, FP-EML 100 comprises a first n-InP buffer layer 220, covered by a separate confinement heterostructure (SCH) InGaAsP layer 240. Preferably, first n-InP buffer layer 220 comprises a thickness on the order of 100 nm and SCH layer 240 comprises a thickness of approximately 70 nm and exhibits a band gap wavelength of 1.15 micron. MQW action regions 180 and 200 are formed over SCH layer 240, preferably using the SAG process. In a preferred embodiment, between 7 and 9 pairs of "barrier" 260 and "well" 280 layers are formed, where for FP laser section 120, the layers are grown in a manner to provide lasing at the desired wavelength. For some embodiments, a device which lases in the wavelength range of 1260–1600 nm is desirable. Other arrangements require a device which lases in the wavelength range of 700–1000 nm. Some conventional EML devices have exhibited excellent characteristics at a wavelength of approximately 1550 nm. An advantage of the FP-EML structure of the present invention is that the FP device can be formed to exhibit a wavelength of 1310 nm, which cannot be achieved using a conventional DFB device in the EML structure. In general, the use of a SAG process to form the MQW active region allows for the FP-EML device of the present invention to be tailored to emit at a wavelength chosen by the designer for a specific system implementation.

Referring back to FIG. 3, a second InGaAsP SCH layer 300 is formed over MWQ active regions 180, 200. Current blocking in the device is provided by Fe-doped InP barriers 320 and 340, formed on either side of the active waveguiding region of FP-EML 100. A p-InP cladding layer 360 is then formed on the top surface of device 100, followed by a p-InGaAs contact layer 380. A first electrical contact pad 400, associated with FP laser 120, is deposited on contact layer 380 over the location of active region 180. A second electrical contact pad 420, associated with EA modulator 140, is deposited on contact layer 380 over the location of active region 200. In a preferred embodiment, first and second electrical contact pads comprise a tri-layer Ti—Pt—Au structure.

In accordance with the properties of the FP-EML device of the present invention, an isolation trench 440 is formed between FP laser section 120 and EA modulator 104, as shown in FIG. 3. In a preferred embodiment, trench 440 comprises a depth of approximately 0.7 microns (into p-InP cladding layer 360) and a width of approximately 20 microns. Trench 440 may be formed using conventional reactive ion etching (RIE) techniques and is used to reduce electrical crosstalk between FP laser section 120 and EA modulator section 140.

FIGS. 4(*a*) and 4(*b*) contain graphs of the "eye diagrams" for both a transmitter using a 1310-EML of the present invention (FIG. 4(*a*)), and a conventional transmitter using a 1550-EML. In particular, the eye diagrams illustrate the effects of dispersion on the transmission at a rate of 10 Gb/s over a distance of 20 km and 40 km. The improvement in the shape of the eye diagram (interpreted as a reduction in dispersion), and the resultant improvement in bit error rate is evident. Very little "overshoot" in the eye is found at 20 km or 40 km when using the 1310-EML transmitter of the present invention. The dispersion for the 13010-EML transmitter is calculated to be approximately 2 ps/km/nm, while the dispersion for the 1550-EML is 17 ps/km/nm.

The above-described embodiments of the present invention are to be considered as exemplary only, with the scope of the present invention limited only by the claims appended hereto.

What is claimed is:

1. An optical transponder module for providing transport of optical communications between a first network and a second network over an intermediate range optical communication system, the module comprising
   a front-end transceiver for receiving input optical communication from the first network and converting said input into an electrical data output, and receiving input electrical data from the second network and converting said electric input into an output optical signal and transmitting said output optical communication to said first network;
   an intermediate range optical transmitter, responsive to the electrical data output from the front-end transceiver for converting said electrical data into an optical output signal for transmission over said intermediate range optical communication system to said second network; and
   an intermediate range optical receiver, responsive to optical data input from the second network for converting said optical input into an electrical data signal applied as an input to said front-end transceiver for conversion to an optical output signal transmitted to said first network,
   wherein said intermediate range optical transmitter comprises an electroabsorption modulated laser including an electroabsorption modulator section responsive to the electrical data output from said front-end transceiver and a Fabry-Perot laser section responsive to the electroabsorption modulator for providing a modulated optical output signal, the electroabsorption modulator section comprising a first multiple quantum well active region comprising a plurality of barrier layers and a plurality of well layers, the Fabry-Perot laser device section comprising a second multiple quantum well active region comprising a plurality of barrier layers and a plurality of well layers, wherein each of said barrier layers and said well layers of said second multiple quantum well active region are thicker than each of said barrier layers and said well layers of said first multiple quantum well active region, respectively.

2. An optical transponder as defined in claim 1 wherein the intermediate range optical transmitter comprises an isolation trench for reducing electrical cross-talk between the Fabry-Perot laser section and the electroabsorption modulator.

3. An optical transponder as defined in claim 1 wherein the Fabry-Perot laser section and the electroabsorption modulator section form a monolithic structure.

4. An optical transponder as defined in claim 1 wherein the Fabry-Perot laser section operates at a wavelength of approximately 1310 nm.

5. An optical transponder as defined in claim 1 wherein the signals propagate over a communications network having an intermediate range of approximately 10–50 km.

6. An optical transceiver for operation in an intermediate range optical communication system, said transceiver comprising
   an intermediate range optical transmitter responsive to an electrical data input signal for converting said electrical data into an optical output signal for transmission over said intermediate range optical communication system; and
   an intermediate range optical receiver, responsive to optical data input from the intermediate range optical communication system and converting said optical data input into a received electrical data signal,
   wherein said intermediate range optical transmitter comprises
   an electroabsorption modulated laser including an electroabsorption modulator section including a first multiple quantum well active region responsive to the electrical data input signal and
   a Fabry-Perot laser section including a second multiple quantum well active region responsive to the electroabsorption modulator for providing a modulated optical output signal,
   the Fabry-Perot laser device section and the electroabsorption modulator section forming a monolithic structure having an isolation trench for reducing electrical cross-talk between the laser section and the electroabsorption modulator.

7. An optical transceiver as defined in claim 6 wherein the the Fabry-Perot laser has an operating wavelength of approximately 1310 nm.

8. An optical transceiver as defined in claim 6 wherein the trench has a depth of approximately 0.7 microns.

9. An optical transceiver as defined in claim 6 wherein the electroabsorption modulator is designed to operate in continuous wave mode.

10. An optical transceiver as defined in claim 6 wherein the signals propagate over a communications network having an intermediate range of approximately 10–50 km.

11. An optical transponder module, the module comprising
   an intermediate range optical transmitter, responsive to electrical data for converting the electrical data into an optical output signal for transmission,
   the intermediate range optical transmitter comprising
   an electroabsorption modulated laser including an electroabsorption modulator section responsive to the electrical data and a Fabry-Perot laser section responsive to the electroabsorption modulator for providing a modulated optical output signal, the electroabsorption modulator section comprising a first multiple quantum well active region comprising a plurality of barrier layers and a plurality of well layers, the Fabry-Perot laser device section comprising a second multiple quantum well active region comprising a plurality of barrier layers and a plurality of well layers, the Fabry-Perot laser device section and the electroabsorption modulator section forming a monolithic structure, each of the barrier layers and the well layers of the second multiple quantum well region are thicker than each of the barrier layers and the well layers of the first multiple quantum well active region, respectively.

* * * * *